US008371452B2

(12) United States Patent
Swain et al.

(10) Patent No.: US 8,371,452 B2
(45) Date of Patent: Feb. 12, 2013

(54) ADJUSTABLE VENTILATION STACK FOR A WATER FILTER SYSTEM

(75) Inventors: David Swain, Palm Harbor, FL (US); Ma Shangfu, Xiamen (CN)

(73) Assignee: Paragon Water Systems, Inc., Clearwater, FL (US)

( * ) Notice: Subject to any disclaimer, the term of this patent is extended or adjusted under 35 U.S.C. 154(b) by 242 days.

(21) Appl. No.: 12/878,169

(22) Filed: Sep. 9, 2010

(65) Prior Publication Data

US 2012/0061313 A1 Mar. 15, 2012

(51) Int. Cl.
*B01D 27/00* (2006.01)
*B01D 35/00* (2006.01)
*C02F 1/00* (2006.01)

(52) U.S. Cl. ..................... 210/436; 210/172.2; 210/472; 210/467; 210/468; 210/469; 210/450; 210/457

(58) Field of Classification Search ........................ None
See application file for complete search history.

(56) References Cited

U.S. PATENT DOCUMENTS 1,150,910 A * 8/1915 Warmington ................. 210/472
2011/0089103 A1* 4/2011 Bommi et al. ................ 210/472

OTHER PUBLICATIONS

BRITA Pitcher & Dispenser User's Guide, www.brita.com, 2010.

* cited by examiner

*Primary Examiner* — Benjamin Kurtz
(74) *Attorney, Agent, or Firm* — Greer, Burns & Crain, Ltd.

(57) ABSTRACT

A water filter system including a filter housing having a filter element for filtering impurities from water and a ventilation stack movably connected to the filter housing for adjusting a position of the stack relative to a level of the water to release air from the water trapped by the filter element during filtration.

14 Claims, 6 Drawing Sheets

126 126 116 118 36 78 80 74 84 30 72 66 66 76 106 100 104 40 92 82 98 90 88 68 46 52 44 32 41 86 42 38 88 90 98 48 92 100 34

ADJUSTABLE VENTILATION STACK FOR A WATER FILTER SYSTEM

BACKGROUND

The present invention relates generally to water filter systems, and more particularly to an adjustable ventilation stack for a water filter system.

Residential potable water is delivered to homes from water sources such as wells and municipal water systems. While treated, the incoming or feed water typically has sediment and other impurities. To remove the sediment and impurities, many households have a filter system connected directly to the incoming water pipe that is typically located in a basement or a garage. Water filter systems may also be connected to a faucet such as a kitchen faucet. These systems are typically mounted underneath a sink or placed on a countertop and connected to the faucet. Water is directed from the incoming water line, through a filter element and then out through the faucet. Such filter systems, however, can be expensive to install and maintain.

Another option is a water pitcher filter system, which includes a specially designed pitcher having a pitcher insert or reservoir that receives a removable filter cartridge. In such a system, the reservoir is filled with a designated amount of water. The water passes through a filter cartridge to remove impurities and is stored in a bottom portion or dispenser portion of the pitcher prior to being poured into a glass or other container.

Filter cartridges in conventional water pitcher systems are smaller and typically less expensive to replace than household, under-counter and above-counter water filter systems. One problem with water pitcher filter systems, however, is that air from the water can be trapped by the filter cartridge during the filtering process and affect the performance of the cartridge. Such systems therefore typically include a vertically projecting ventilation stack or "smokestack" that extends from the filter cartridge to release the trapped air. However, because there are several different sizes and styles of water pitchers and water containers, filter cartridges and the ventilation stacks associated with these cartridges are limited to specific container sizes.

SUMMARY

A filter system is provided for a water pitcher or similar container that includes an adjustable ventilation stack that releases air trapped within a filter cartridge. The stack is movable to different vertical elevations to accommodate different sized pitchers and varying water level heights within those pitchers.

More specifically, a water filter system is provided that includes a filter housing having a filter element for filtering impurities from water and a ventilation stack movably connected to the filter housing for adjusting a position of the stack relative to a level of the water to release air from the water trapped by the filter element during filtration.

In another embodiment, a water filter system is provided that includes a filter cartridge including a base, an end cap removably connected to the base, and a filter element. A ventilation stack is movably connected to the end cap where the stack defines an inner channel and at least two lateral openings in communication with the inner channel for releasing air from the filter cartridge. To form a seal between the stack with the end cap, the stack includes a groove and an O-ring positioned in the groove. The O-ring also frictionally engages an inner surface of the end cap to allow for axial adjustment of the stack relative to the end cap.

DETAILED DESCRIPTION

Figure 1:
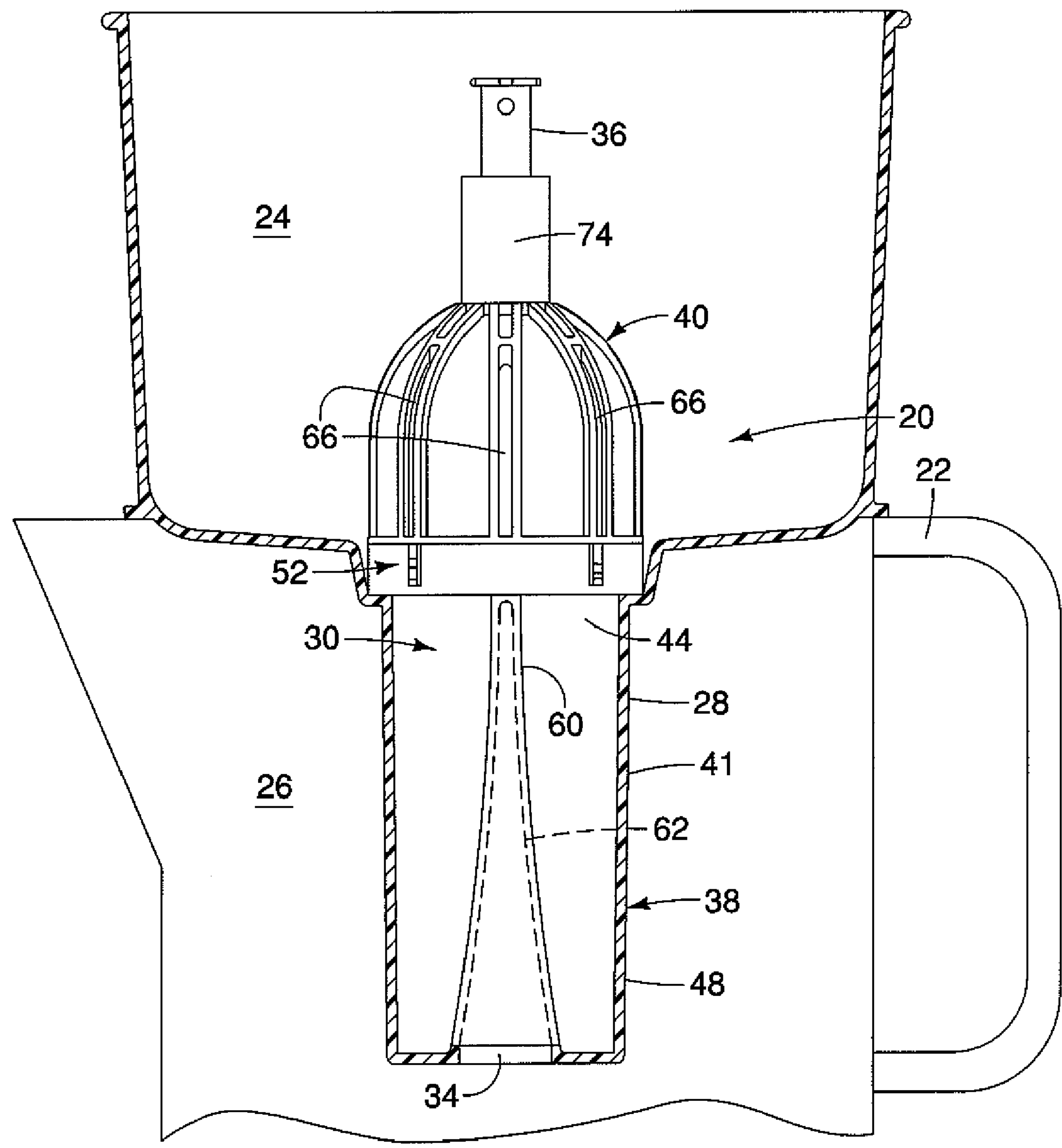
FIG. 1 is a fragmentary cross-section view of the present water filter system.
Figure 3:
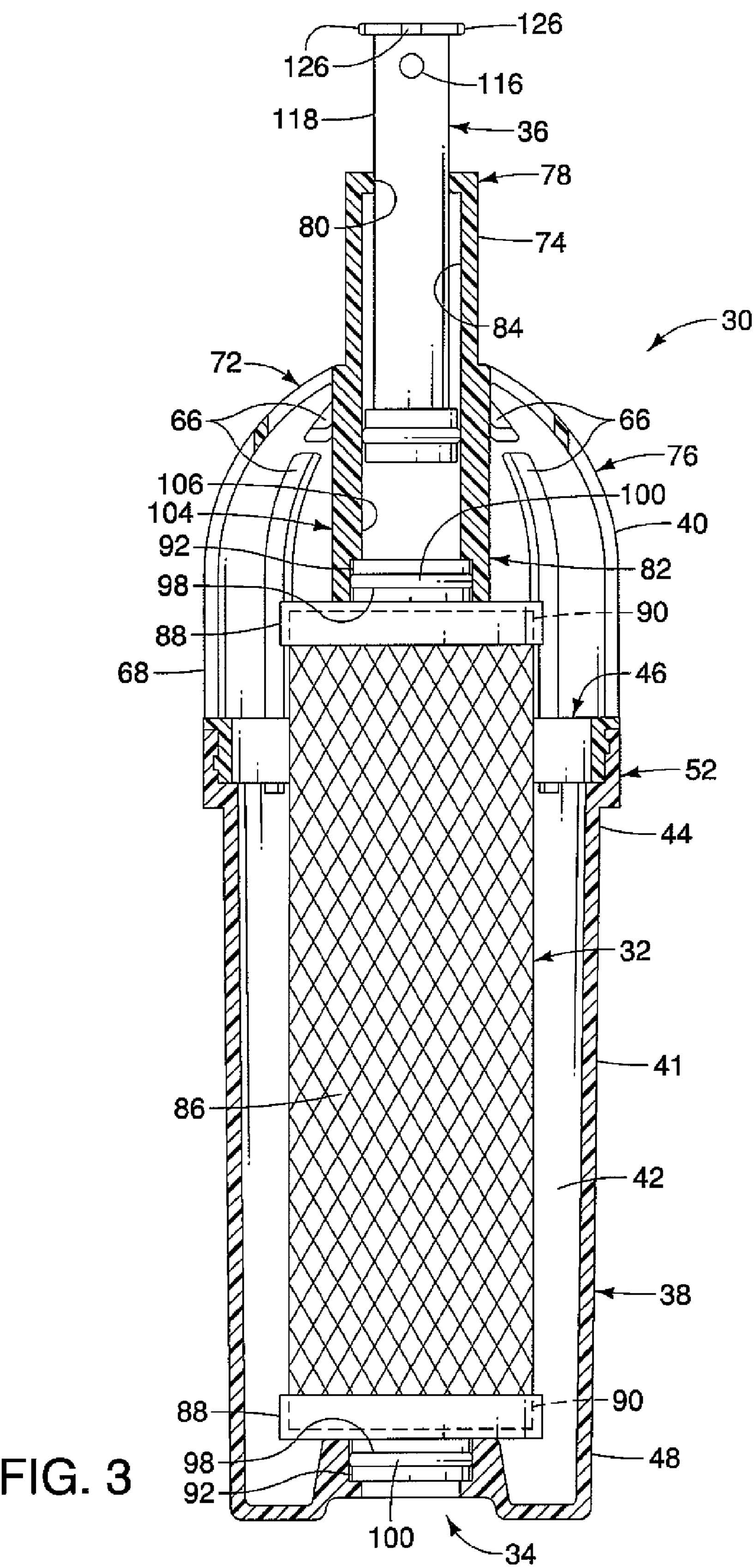
FIG. 3 is a cross-section view of the filter cartridge taken substantially along line 3-3 in FIG. 2 and in the direction generally indicated.

Referring now to FIGS. 1 and 3, a water filter system, generally designated as 20, is used in homes, businesses and other facilities to filter water retained in a pitcher or other similar container. As shown in FIG. 1, a water pitcher 22 is configured with two general compartments, an upper compartment or reservoir 24 and a lower compartment or dispenser 26, where the upper compartment has a downwardly depending receptacle 28 for receiving a water filter cartridge 30. After the filter cartridge 30 is installed in the upper compartment 24 of the pitcher 22, water is poured into or otherwise supplied to the upper compartment where it passes through the filter cartridge. As is known in the art, in some cases, the upper compartment 24 is removable from the pitcher 22. Also in other cases, the upper compartment does not have the receptacle 28. The cartridge 30 is inserted through an opening defined by a bottom wall of the upper compartment and depends into the lower compartment.

In particular, the water moves through a filter element 32 (FIG. 3), such as a carbon filter, located inside the cartridge 30 that removes the impurities. The filtered water then passes through an outlet 34 at the bottom of the filter cartridge 30 and into the lower compartment 26 of the pitcher 22, from where it is pourable into a glass or other container.

Filtering can be inhibited, however, during the filtration process by air in the water that is trapped by the filter element 32. In conventional filter cartridges, the trapped air accumulates on the filter element, decreasing the effectiveness of the filter element. To address this ventilation issue, the present filter cartridge 30 includes a movable ventilation stack 36 that allows the trapped air to be released from the filter element 32 at different water levels in various types of water containers.

Referring now to FIGS. 1-4 and 8, the filter cartridge 30 includes a base 38 and an end cap 40 removably connected to the base. The base 38 has a shell 41 with a generally circular cross-section defining an inner chamber 42. The top end or upper end 44 of the base 38 defines an opening 46 having a designated diameter. A bottom end or lower end 48 includes the outlet 34, which defines an opening having a diameter that is less than the diameter of the opening 46 at the upper end 44. The upper end 44 of the base 38 includes an annular collar 52 having a relatively larger diameter than the shell 41 to define a shoulder 53. An inner surface 54 of the shoulder 53 with a pair of opposing locking tabs 56 (FIG. 4 (in phantom) and FIG. 8). The locking tabs 56 help secure the end cap 40 to the base 38 as described below.

Referring now to. FIG. 1, an outer surface 58 of the base 38 defines a generally V-shaped channel or groove 60 that engages a corresponding protruding surface 62 (shown in phantom) on a water pitcher or container 22 for guiding and temporarily locating the filter cartridge 30 in the upper compartment or reservoir 24 of the water pitcher.

Figure 2:
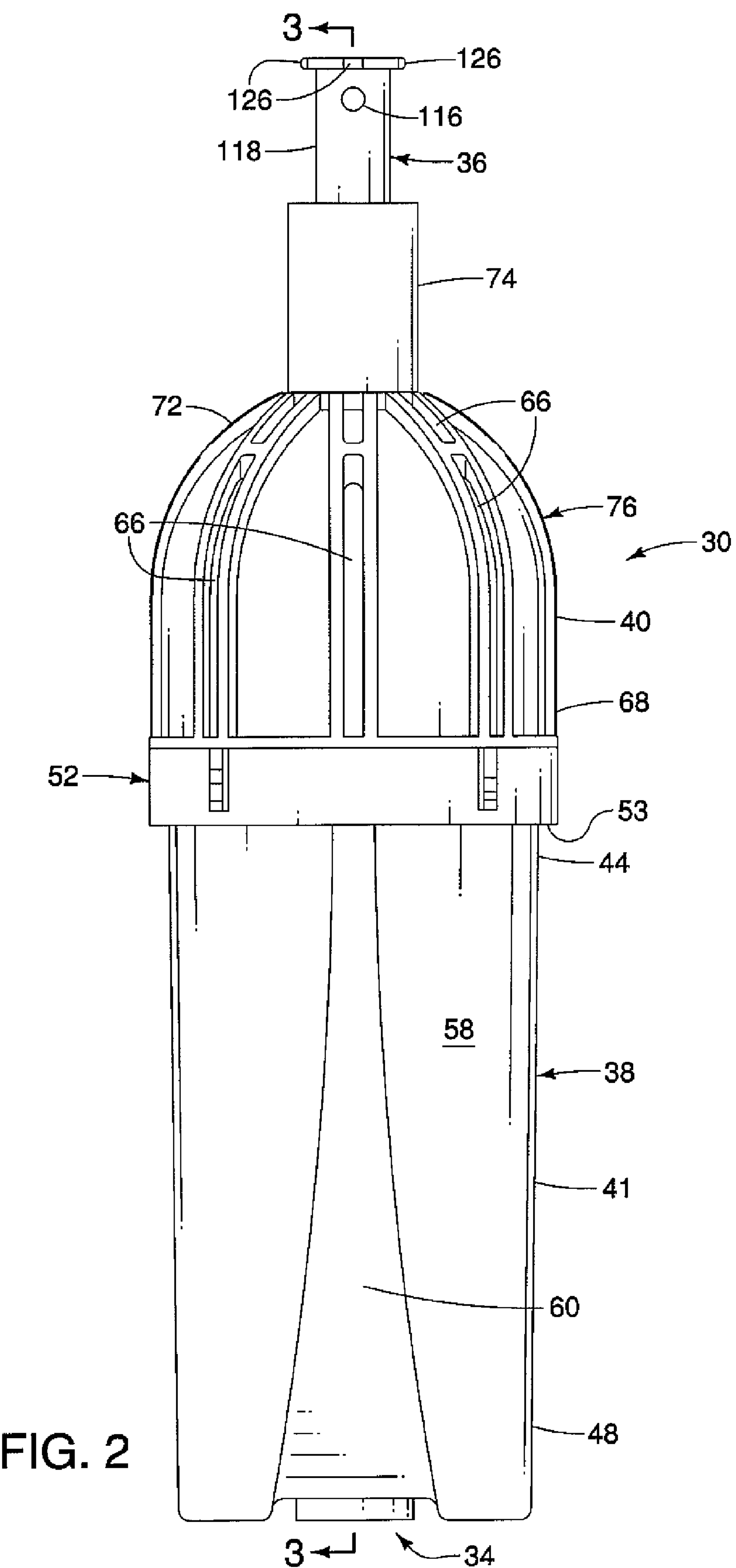
FIG. 2 is an enlarged front view of the filter cartridge for the water filter system of FIG. 1.
Figure 4:
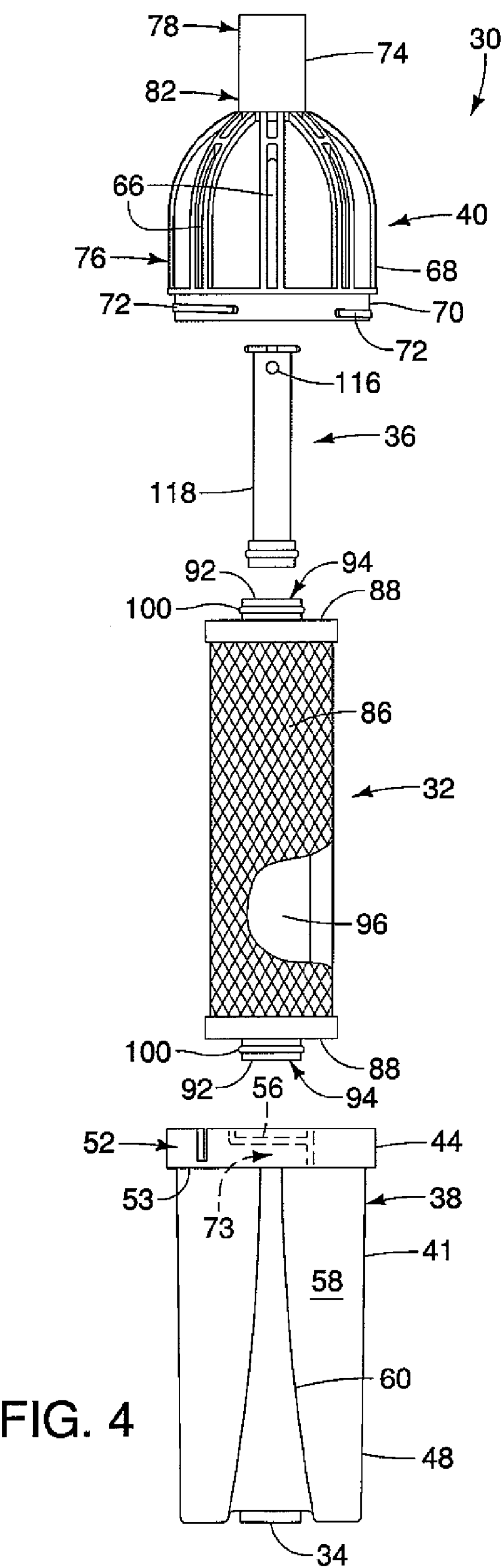
FIG. 4 is an exploded perspective view of the filter cartridge of FIG. 2.

Referring now to FIGS. 1, 2 and 4, the end cap 40 is generally dome-shaped and defines at least one and preferably, a plurality of elongated slots 66 that act as water inlets for receiving unfiltered water supplied to the upper compartment 24 of the pitcher 22. A bottom portion 68 of the end cap 40 includes an annular flange 70 (FIG. 4) including radially protruding helical tabs 72 that threadably engage corresponding grooves 73 (FIG. 4) defined by the locking tabs 56 of the base 38 for securing the end cap to the base.

An upper portion 72 of the end cap 40 includes a tube 74 extending from an end cap body 76. The tube 74 is preferably integrally formed with the body 76 and has an upper end 78 that defines a top opening 80 and a lower end 82 (FIG. 3) that depends within a chamber 84 defined by the body 76.

Referring now to FIGS. 3 and 4, the filter element 32 preferably has a generally cylindrical shape and may include any suitable filter media such as a carbon block or the like. In particular, the filter element 32 includes a filter medium surrounded by netting or mesh 86 and opposing port caps 88. Each of the port caps 88 is generally circular shaped and defines an inner recessed portion 90 (shown hidden) configured to fit over an end of the filter element 32. A circular port 92 extends axially from each port cap 88 where each port defines an opening 94. A central chamber 96 extends axially between the openings 94 in the port caps 88 and through a middle portion of the filter element 32. Additionally, each port 92 includes at least one annular groove 98 for receiving an O-ring 100.

As the filter element 32 is inserted into the inner chamber 42 defined by the base 38, one of the ports 92 is inserted into the opening 50 at the lower end 48 of the base. The O-ring 100 on the port 92 forms a seal between an inner surface 102 of the base 38 and the port. The opposing port 92 fits into the bottom inner end 104 of the tube 74 on the end cap 40 where the O-ring 100 on the port 92 forms a seal between the port and an inner surface 106 of the tube.

Referring to FIGS. 2-5, the ventilation stack 36 is inserted through the opening 80 defined by the tube 74. The ventilation stack 36 is configured to reciprocate vertically within the opening 80 and includes a closed top end 108 and a bottom end 110 that defines an opening 112. An inner chamber 114 extends from the top end 108 to the opening 112. The top end 108 of the ventilation stack 36 defines at least one, and preferably two, opposing radially oriented lateral openings or outlets 116 extending from an outer surface 118 of the stack 36 to the inner chamber 114. Opposite the top end 108, the bottom end 110 of the ventilation stack 36 includes axially spaced rings 120 that define a groove 122 therebetween. An O-ring 124 is inserted into the groove 122 and forms a seal between the ventilation stack 36 and the inner surface 106 of the tube 74. To allow the ventilation stack 36 to be adjusted relative to the end cap 40, the O-ring 124 also frictionally engages the inner surface 106 of the tube 74, which creates resistance to hold the ventilation stack 36 at a particular position relative to the end cap 40.

Figure 5:
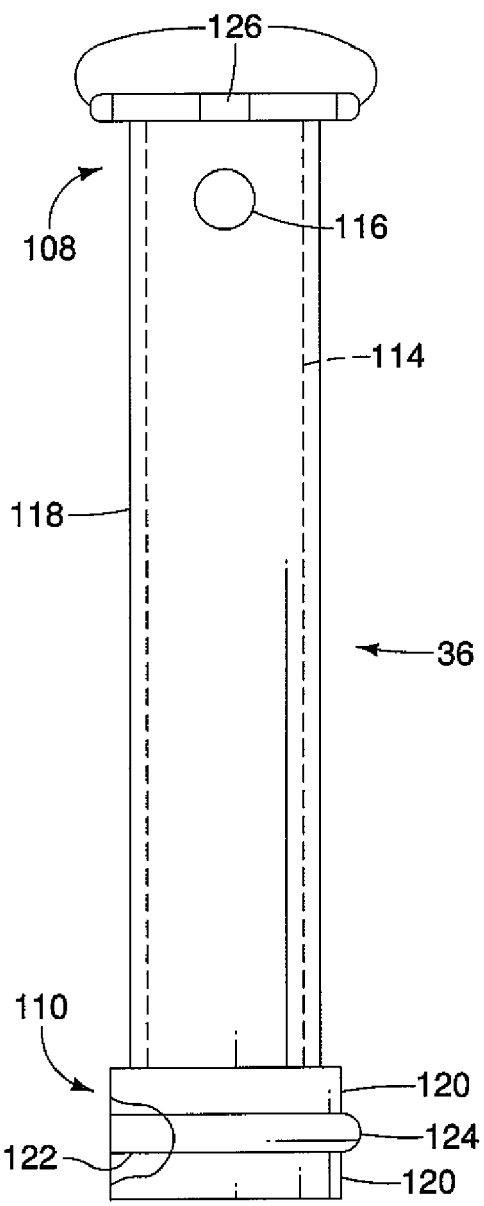
FIG. 5 is a side view of the ventilation stack of the filter cartridge of FIG. 2.
Figure 6:
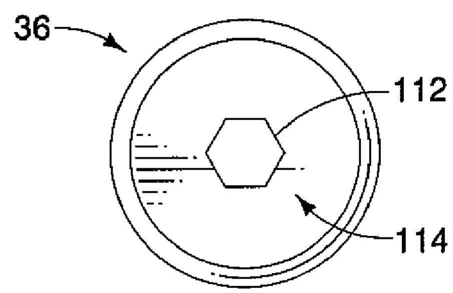
FIG. 6 is a top view of the ventilation stack of FIG. 2.
Figure 7:
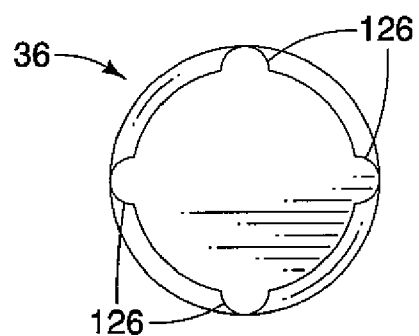
FIG. 7 is a top view of the ventilation stack of FIG. 2.
Figure 8:
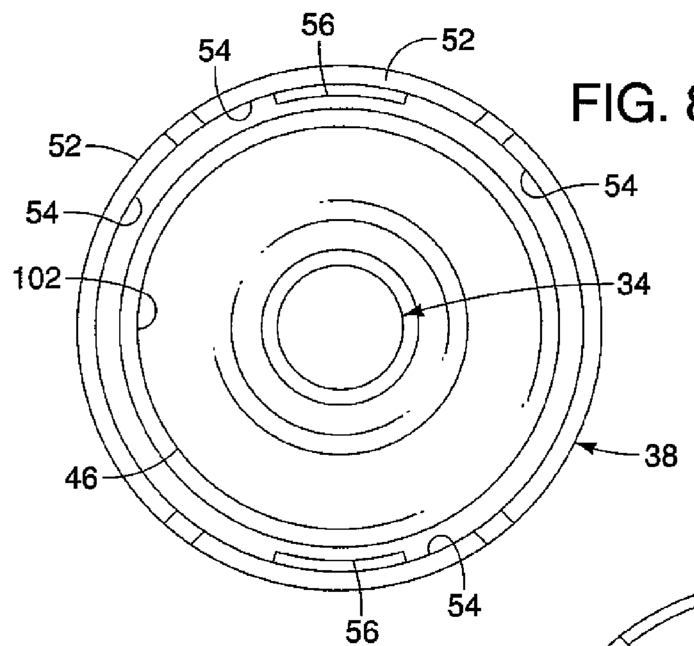
FIG. 8 is a top view of the base of the filter cartridge of FIG. 2.
Figure 9:
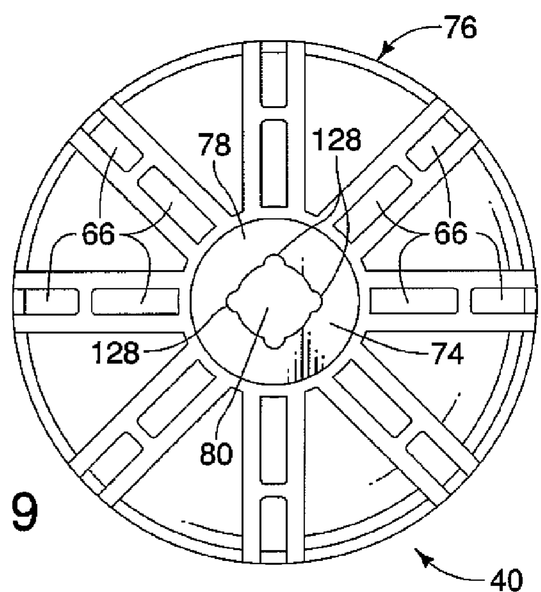
FIG. 9 is a top view of the upper portion of the filter cartridge of FIG. 2.
Figure 10:
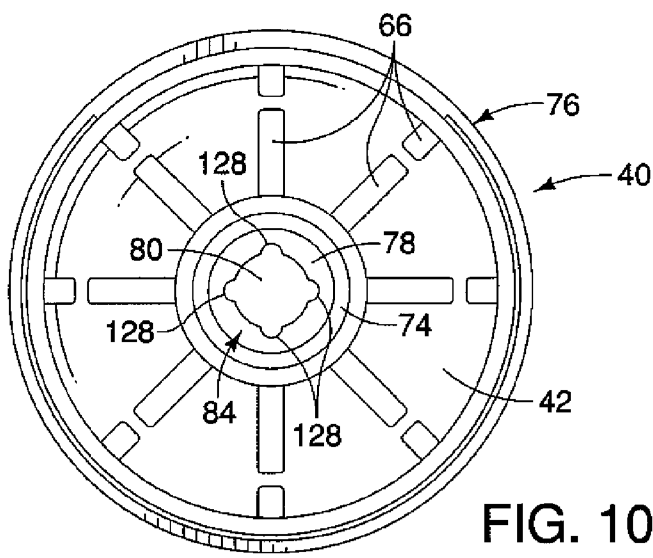
FIG. 10 is a bottom view of the upper portion of the filter cartridge of FIG. 2.

As shown in FIGS. 5 and 7, the top end 108 of the ventilation stack 36 is generally circular and preferably has four stops 126 extending radially from the outer surface 118 of the stack. The stops 126 are spaced approximately 90° from each other and align with corresponding grooves 128 (FIG. 9) formed in the opening 80. Thus, after the ventilation stack 36 is attached to the end cap 40, the stack is turned such that the stops 126 are misaligned with the corresponding grooves 128 on the end cap. This prevents the ventilation stack 36 from inadvertently moving completely downwardly through the opening 80 and into the end cap 40 when the stack is adjusted downwardly relative to the end cap. If the ventilation stack 36 needs to be removed or replaced, the stops 126 are aligned with the corresponding grooves 128 and the ventilation stack is moved downwardly through the opening 80 and released from the end cap 40.

In operation, the filter cartridge 30 is inserted into the upper compartment or reservoir 24 of a water pitcher 22 or other water container so that the groove 60 on the outer surface 58 of the base 38 engages the corresponding protruding surface 62 on the pitcher. The ventilation stack 36 is then adjusted by the user relative to the filter cartridge 30 so that the lateral outlets 116 on the stack are above the water level in the upper compartment 24 of the pitcher 22. Thus, the height of the ventilation stack 36 is axially adjustable to accommodate different sized pitchers or containers and different water levels within those containers. After the ventilation stack 36 is adjusted to the proper height, unfiltered water is supplied to the upper compartment 24 of the pitcher 22. The water in the upper compartment 24 enters the filter cartridge 30 through the slots 66 on the end cap 40 and then passes through the filter element 32. After passing through the filter element 32, such as a carbon block, the filtered water enters the central chamber 96 of the filter element and then moves downwardly (downwardly is referred to in relation to the cartridge in the position depicted in FIGS. 1-4) through the bottom opening 50 of the base 38 and into the lower compartment 26 of the pitcher 22. The filtered water can then be poured from the pitcher 22 into a glass or other container.

As stated above, air in the water tends to be trapped and accumulate on the filter element 32 during use. The ventilation stack 36 allows the air to be released from the filter element 32. Specifically, the trapped air moves upwardly through the central chamber 96 of the filter element 32, through the ventilation stack 36 and out through the lateral outlets 116. Thus, the air from the water is released and does not accumulate and inhibit the effectiveness of the filter element 32. Furthermore, the ventilation stack 36 of the present filter system 20 is axially adjustable so that the lateral outlets 116 are above the water level in any type or sized water pitcher to allow trapped air to be released and maintain the filtering effectiveness of the filter element 32.

The present filter system 20 is an advantage over conventional filter pitcher systems because the ventilation stack 36 is movable and thereby adjustable to accommodate different sized pitchers 22 and containers and different water levels in those containers. This eliminates the need to have multiple sized ventilation stacks for different pitchers or containers, which is burdensome because a consumer must store the various ventilation stacks and take time to remove and replace the individual stacks depending on the type of pitcher or container that they own. Additionally, a single adjustable ventilation stack reduces manufacturing costs as only one ventilation stack needs to be made instead of several stacks.

While a particular embodiment of the adjustable ventilation stack for a water filter system has been described herein, it will be appreciated by those skilled in the art that changes and modifications may be made thereto without departing from the invention in its broader aspects and as set forth in the following claims.

The invention claimed is:

1. A water filter system comprising:

a filter housing including a tube and a filter element for filtering impurities from water;

a first seal member between said filter element and said tube;

a ventilation stack movably connected to said tube for adjusting a position of said stack relative to a level of the water to release air from the water trapped by said filter element during filtration; and a second seal member between said ventilation stack and said tube.

2. The water filter system of claim 1, wherein said filter housing includes a base and an end cap removably connected to said base.

3. The water filter system of claim 2, wherein said end cap has a dome shape.

4. The water filter system of claim 1, wherein said ventilation stack defines at least one lateral opening for releasing the air.

5. The water filter system of claim 1, wherein at least one of said first seal member and said second seal member includes an O-ring.

6. The water filter system of claim 1, wherein said ventilation stack includes at least one radially oriented projection for engaging said filter housing and stopping downward movement of said ventilation stack relative to said tube.

7. The water filter system of claim 6, wherein said ventilation stack defines an elongated inner channel and at least one radially oriented opening in communication with said inner channel for releasing the air.

8. The water filter system of claim 1, wherein said filter element is a carbon block.

9. A water filter system comprising:

a filter cartridge including a base, an end cap removably connected to said base, and a filter element, said end cap including a tube;

a first seal member between said filter element and said tube;

a ventilation stack movably connected to said tube, said stack defining an inner channel and at least two lateral openings in communication with said inner channel for releasing air from said filter cartridge; and a second seal member between said ventilation stack and said tube.

10. The water filter system of claim 9, wherein said base and said end cap each define an opening and said filter element includes an upper port, a lower port and a throughbore extending between said upper port and said lower port, said upper and lower ports respectively configured to engage said tube and said opening of said base so that water flows through said filter element and exits through said opening in said base.

11. The water filter system of claim 9, wherein said end cap includes said ventilation stack, said ventilation stack being frictionally adjustable within said tube to different positions relative to said end cap.

12. The water filter system of claim 11, wherein said ventilation stack includes an outer surface and at least one stop extending from said outer surface for engaging said end cap, wherein upon axial rotation of said stack in said tube, said at least one stop inhibits downward movement of said ventilation stack relative to said filter cartridge.

13. The water filter system of claim 9, wherein said end cap defines at least an inlet for receiving water.

14. The water filter system of claim 9, wherein said filter element is a carbon block.

* * * * *